March 3, 1931.                R. BOWN ET AL                1,794,393
                    TRANSMISSION MEASURING APPARATUS
                    Original Filed Oct. 22, 1929    2 Sheets-Sheet 2
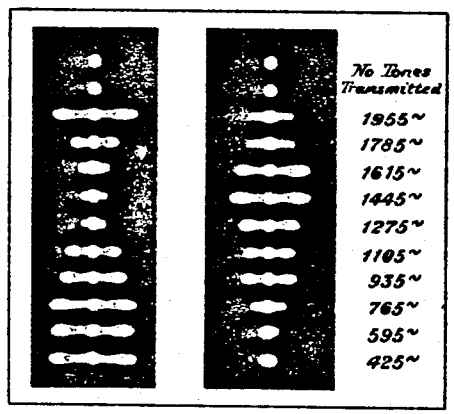
Fig. 2 — Cathode Ray Oscillograph Contact Pictures of Multitones.
Fig. 3 — Fast Oscillograph Record of a Representative Commutated Multitone Characteristic.
INVENTORS
R. Bown & R.K. Potter
BY
ATTORNEY Mar. 3, 1931

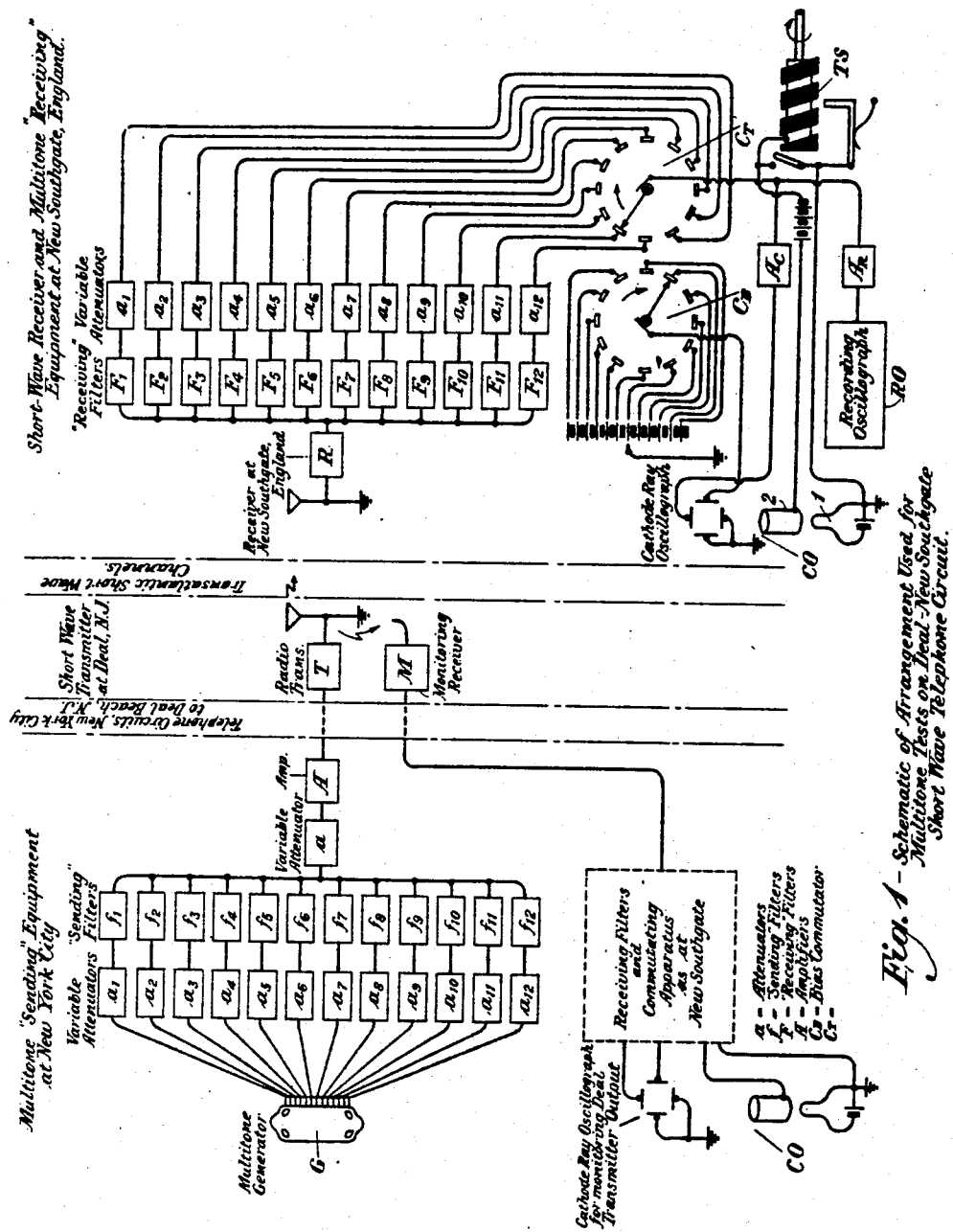

1,794,393

UNITED STATES PATENT OFFICE

RALPH BOWN, OF MAPLEWOOD, AND RALPH K. POTTER, OF NETCONG, NEW JERSEY, ASSIGNORS TO AMERICAN TELEPHONE AND TELEGRAPH COMPANY, A CORPORATION OF NEW YORK

TRANSMISSION-MEASURING APPARATUS

Application filed October 22, 1929, Serial No. 401,559. Renewed September 6, 1930.

Telephone engineering concerns itself quite extensively with the determination of losses over transmission circuits and the variation of such losses with frequency resulting in a distortion of the speech. Such measurements when made on a long wire circuit may proceed more or less leisurely and the results may be plotted in the form of a frequency amplitude curve with confidence that the final data represented by the curve will correspond to the transmission condition of the circuit for a long period to follow. In other words, the transmission characteristic of the wire circuit may be expressed in a single picture (analogous to what in moving picture parlance is called a "still") which will continue to be a fairly good likeness as long as the subject is not arbitrarily modified.

Up to comparatively few years ago telephony was confined to wire circuits and a measurement technique adapted to the constancy of such a system had been elaborately developed. The adoption of radio channels as auxiliary links in the telephone system however, introduces a new factor in the measurement problem. The single picture is here entirely insufficient to represent the transmission conditions as the subject is continually undergoing changes which, in the case of a short wave circuit for example, may result in remarkable differences over a period as short as a fraction of a second. In such a case not only will the amplitudes of the frequencies differ from each other, but from instant to instant the relative amplitudes of the different frequencies vary, so that the frequency which has the greatest amplitude at one instant may have the smallest amplitude of all a moment later. To actually represent the transmission characteristic under these conditions it is necessary to resort to what might be termed a "moving picture" of the transmission characteristic.

The recognized method of measuring the transmission characteristic of a wire circuit in order to produce a "still" picture of the circuit is to send a known amount of current into the circuit and to measure the current appearing at the output of the circuit as the frequency is varied over the range with which we are concerned. A frequency amplitude curve may then be constructed to represent the results of the measurements. In order to follow the changes which are apt to occur in a short wave radio circuit it would be necessary to perform such measurements very rapidly and to repeat the groups of measurements in continuous succession. To attempt to do this by sending the different frequencies of the voice band rapidly and in continuous succession, and to measure them at the same rate at the receiver, would introduce an undesirable complication due to the transient character of the test signals. In case the same frequency travels over paths of different length between transmitter and receiver, an overlapping with successive frequencies will occur which would confuse the measurements.

In accordance with the present invention therefore, it is proposed to simultaneously transmit a series of tones distributed at regularly spaced intervals over the band to be measured, each tone frequency of a series being transmitted at the same amplitude. At the receiving point these tones are separated by means of corresponding filters so that they are continually at hand for recording or observation. By means of a communicating device the outputs of the different filters are then impressed in rapid succession upon the one pair of deflection plates of a cathode ray tube. At the same time a second commutator rotating synchronously with the first (preferably connected mechanically thereto) progressively impresses different biasing potentials upon the other pair of deflection plates so that a different biasing potential corresponds to each of the bands selected by the tone commutator. As a result there appears across the screen of the cathode ray tube a series of parallel lines regularly spaced at suitable intervals depending upon the successive bias differences, each line corresponding to one of the frequencies and having a length proportional to the amplitude of the frequency as received. In order to produce this result the commutator must be operated at such a speed that each frequency will be successively impressed upon the deflection plates of the oscillograph at recurring intervals so short that the eye will not detect the interruptions in the image. The diffusion effect of the screen of the oscillograph will however, assist in maintaining the continuous appearance of the lines.

By observing the variations in the lines upon the screen the changes in the transmission characteristic may be noted as they occur. A record of the changes may be made by simply sketching the envelopes of the lines as they appear upon the screen of the cathode ray tube, this method being sufficiently accurate when the variations in the pattern shape are slow. Even during times when changes in the shape of the multi-tone patterns occur rapidly an experienced observer is able to make enough sketches of this character to show with sufficient exactness the nature of the distortion at particular times of the day.

Another method of recording consists in making so called "contact pictures" of the patterns. To do this the anode circuit of the oscillograph is opened and a sensitive film pressed against the screen. The anode circuit is then closed and the film exposed during one or more complete operations of the commutator, whereupon the anode circuit is again opened. By thus making successive films the transmission changes over any desired period of time may be recorded.

If desired, the sequences of changes in the multi-tone transmission characteristic may be obtained by recording the commutated tones upon a moving element oscillograph of the ordinary type. With such an oscillograph the successive groups of oscillations of different frequencies are recorded on sensitive paper in the form of continuous graph.

The invention will now be more fully understood from the following description and the accompanying descriptive drawings in which Figure 1 is a circuit diagram of apparatus embodying the principles of the invention, while Figures 2 and 3 depict typical examples of cathode ray oscillograph records and moving element oscillograph records respectively.

Referring to Fig. 1 it will be seen that at the sending end of the system (which is illustrated as being applied to the radio telephone system between the United States and England) a multi-tone generator G is installed with an output of a sufficient number of frequencies so that when spread at proper intervals over the voice range, or other range to be measured, they will be representative of the entire range. The generator G for example, may be a multi-tone generator of the type used in connection with ordinary voice frequency carrier telegraph circuits, such a generator having an output of twelve (12) frequencies ranging from 425 to 2295 cycles at intervals of 170 cycles. A series of sending filters designated $f_1$ to $f_{12}$ are inserted in the twelve output circuits of the generator to suppress harmonics, and variable attenuators $a_1$ to $a_{12}$ are also included in the output circuits for adjusting the amplitudes of the tone frequencies to the same output level. The several frequencies appearing in the outputs of the attenuators are impressed together upon an amplifier A of any known type, ahead of which a variable attenuator $a$ may be provided for making simultaneous adjustments of the amplitude of all of the tones. After being suitably amplified the tones are impressed upon the radio transmitter T of the short wave channel whose transmission is to be observed.

To assist in maintaining the tones sent out at the same amplitude monitoring apparatus is provided at the sending end. This includes a monitoring radio receiver M located sufficiently near the radio transmitter so that the transmission changes due to the ether itself will be negligible. From this receiver a circuit leads to receiving filters, commutating apparatus, and oscillograph apparatus located near the multi-tone sending equipment, this apparatus being symbolically illustrated and identical in construction with the corresponding apparatus at the receiving end of the system which will be described later. By adjusting the attenuators $a_1$ to $a_{12}$ so that the image corresponding to each frequency appearing upon the screen of the monitoring oscillograph is of the same length, the outputs of the different tone frequencies will have the same amplitude, and any unequality in the corresponding images observed in the oscillograph at the distant receiving station will therefore be due to the effects of the radio transmission path.

At the distant radio receiver (herein indicated as being located at New Southgate, England) radio receiving apparatus R of any known type is provided, and from the received radio wave the multi-tone test signal corresponding to the simultaneous tones transmitted from the sending end will be reproduced by demodulation. Receiving filters $F_1$ to $F_{12}$ are provided for separating the twelve-tone test signal into its single frequency constituents. If desired, variable attenuators $a_1$ to $a_{12}$ may be provided on the output sides of the receiving filters to make any arbitary changes an observer may wish to make in any particular received tone, although it will be understood that for purposes of accurate observation of the relative effects of the transmission path upon the tone frequencies, the variable attenuators at the receiver should all be set for zero attenuation. The outputs of the several filters are individually connected to different segments of a rotating commutator $C_T$ whose brush is connected (through an amplifier $A_C$ if desired) to one of the horizontal plates of the cathode ray oscillograph, the other plate being grounded. A similar commutator C$_B$ has its segments connected to different points of a biasing battery and its brush is connected to one of the vertical plates of the cathode ray oscillograph CO, the other vertical plate also being connected to ground. Consequently when the brush of the commutator C$_T$ rests upon the segment corresponding to a particular receiving filter the tone passed by that filter will be applied to the horizontal deflecting plates and thereby cause a rapid oscillation of the cathode ray of the oscillograph in a vertical plane. This oscillation will be so rapid that the image on the oscillograph appears as a continuous vertical line. The spacing of the line along the horizontal axis is determined by the biasing potential upon the segment of the commutator C$_B$ upon which the commutator brush bears at the moment. As there is a different biasing potential applied by commutator C$_B$ for each tone frequency received, the vertical line images appearing on the screen for the successive frequencies will be spaced from each other horizontally as shown in Fig. 2. The commutators should be rotated at such a rate of speed that the successive images (vertical lines) corresponding to any given frequency will recur at such short intervals that the eye cannot detect the interruption. At the same time the speed should not be so great that the lowest frequency involved would be interrupted too soon for at least one competent cycle to be recorded as a vertical line upon the oscillograph.

The vertical lines appearing upon the oscillograph screen constitute a frequency amplitude pattern representing the audio frequency transmission characteristic of the radio circuit. In practice it has been found that if the rate of commutation is about twelve and one-half sweeps of the commutator per second, and twelve multi-tone frequencies of the order above mentioned are employed, the pattern will be sufficiently free from flicker and yet fast enough to portray any variations which the eye is capable of following. Incidentally, it should be noted that these twelve tones which are entirely independent at the sending and receiving ends of the system constitute, in effect, twelve separate telegraph circuits. The independence of the twelve channels may be clearly demonstrated by the appearance and disappearance of the image corresponding to a particular tone of the cathode ray tube pattern, as the circuit of that particular tone is opened and closed at the sending end. It will be observed that when one tone is interrupted the remaining tones will be unaffected.

It will be understood, of course, that the cathode ray oscillograph is of a well known type in which a ray stream is produced by electrons expelled from the heated filament 1, a cylindrical electrode 2 functioning to focus the electrons and drive them across the intervening space to the deflecting plates. The electrons focused and driven by the electrode 2 impinge the fluorescent screen to produce a luminous spot of light. Potential variations impressed across the vertical deflecting plates cause the spot of light to be shifted horizontally, while potential variations across the horizontal deflecting plates shift the spot of light vertically.

In order to record permanently the picture given from instant to instant of the transmission conditions of the circuit, the envelope of the tone pattern as it appears upon the screen can be sketched by hand. For example, referring to Fig. 2, in the upper part of the figure the vertical lines of light correspond to the amplitudes of the individual frequencies involved. By drawing a horizontal line through the centers of the vertical lines and then drawing an envelope along the top of the vertical lines, the amplitude frequency characteristic at a particular instant will be represented. In the case of a short wave circuit this characteristic may undergo a remarkable change in the space of only a few seconds so that the characteristic will be as represented in the lower part of Fig. 2. The observer may then draw another sketch corresponding to the characteristic as indicated in the lower part of Fig. 2. By drawing a sufficient number of sketches at short intervals a satisfactory record may be made when the variations in the pattern shape are comparatively slow. It has been found that even during times when the changes in the shape of the multi-tone patterns are more rapid an experienced observer can make a sufficient number of sketches of this kind to show with reasonable exactness the character of the distortion at particular hours of the day.

Where more accurate record is desired so called "contact pictures" of the patterns may be made. In order to do this some means must be provided to interrupt the cathode ray of the oscillograph while a sensitive film is pressed against the end of the screen and then again set the cathode ray into operation for a sufficient length of time to properly expose the film to the images produced upon the oscillograph screen by the several frequencies. Accordingly, a spiral timing switch TS is provided which consists of a rotating cylinder of non-conductive material in which a spiral groove is cut, with a suitable strip of conducting material wound in the groove, and the spiral conductor thus formed constitutes one contact of the switch, the other contact of the switch consisting of a suitable contact element movable along the axis of the rotating spiral and capable of movement into and out of contact with the spiral. The movable element of the switch is, in the case indicated, connected to ground, and the spiral conductor is connected through a suitable battery to the focusing and electron driving element 2 of the oscillograph.

When the movable element of the spiral switch is out of contact with the spiral element the circuit of the focusing member 2 is open, and the cathode ray stream ceases. By moving the movable element of the switch along the axis of the spiral to any predetermined distance from the end of the spiral and then dropping it into contact with the spiral conductor, the circuit will be closed through the contact between the movable element and the spiral conductor until the movable element has been carried along to the end of the spiral, whereupon the circuit is opened. By the use of this mechanism the conductor of the spiral timing switch may be closed after the film is placed in position, and the film is then exposed under the control of the timing switch which closes the circuit during one or more complete revolutions of the commutator shaft. Preferably the timing switch should be geared to the commutator shaft so as to move at a rate determined by the rate of the commutator. It has been found that a single sweep of the commutator exposing each tone about 1/150 of a second is sufficient to produce a useful record. When the patterns are changing slowly the films may be exposed two or more complete cycles to improve the contrast between the images. Contact pictures of this type give much more accurate transmission information than hand drawn sketches, particularly at times when the patterns are changing shape rapidly. They possess the same disadvantage of the sketch however, in that it is not possible to take contact pictures in rapid and regular succession so that the time sequence of changes could be fully recorded when the patterns changed shape rapidly.

In order to obtain the sequence of changes in the multi-tone transmission characteristics the commutated tones may be recorded by means of a moving element oscillograph of known type as indicated symbolically at RO in Fig. 1. As is known, such an oscillograph produces a continuous graphic record upon a rapidly moving sensitive film. By using such an oscillograph it has been found that twelve complete transmission characteristics can be recorded on the sensitized paper, or film, each second. A typical record of a multi-tone pattern taken on such an oscillograph film is shown in enlarged form in Fig. 3. The detail of this record is sufficient to show the effect of the commutation between successive frequencies to be negigible, as the several oscillations of the same frequency in each group, between successive commutations, have substantially the same amplitude.

If the multi-tone band were extended much below 425 cycles, which is the lowest frequency represented in Fig. 3, it would obviously be necessary to decrease the commutation rate in order to get a sufficient number of cycles at the lower frequency, or else to apportion the commutation intervals with respect to frequency so that the same number of cycles can be recorded for each frequency. This can obviously be done by making the segments of the commutator longer for the lower frequencies than for the higher frequencies. The multi-tone records corresponding to Fig. 3 are usually taken on a sensitized paper strip moving at such a rate that each complete characteristic ($x$ to $y$) occupies about 3/4 of an inch along the length of the film. In the particular case illustrated the highest frequency tone (2295 cycles) was interrupted in this multi-tone moving picture in order to show more clearly the interval occupied by the successive characteristics. This is shown by the narrow band of the record of uniform width at $x$ and $y$.

The apparatus above described may also be used for measuring the intermodulation between various frequencies of the voice band. This may, in general, be accomplished by transmitting frequencies corresponding to only a part of the individual channels of the multi-tone system. Then if there is no intermodulation between the waves corresponding to the tones transmitted, the oscillograph at the receiving end will only record or indicate an image for each tone transmitted. If however, there are intermodulation components resulting from the waves corresponding to the particular tones transmitted, and if any such components fall into adjacent channels of the multi-tone system, the oscillograph will indicate the amplitude of the intermodulation products which thus fall in adjacent channels.

In order that this may be more clearly understood, let us consider the manner in which intermodulation may take place between different frequencies in the voice band. Suppose we consider two audible frequencies. Modulation may take place between these two frequencies in the voice range directly due to distortion in voice frequency amplifiers or other voice frequency apparatus. Modulation may also take place at some intermediate frequency where the two voice frequencies are stepped up to an intermediate range. Finally, intermodulation may take place in the radio apparatus between two radio frequencies corresponding to the two voice frequencies.

Intermodulation at radio frequency is, in general, the factor with which we are most seriously concerned. For example, let $f$ and $f'$ be the radio frequencies corresponding to the two telephone frequencies. Not only will modulation products result corresponding to the sum and difference of the frequencies $f$ and $f'$, but modulation products will result corresponding to the sums and differences of the various harmonics or multiples of the frequencies $f$ and $f'$, so that, in general, we may write $mf \pm nf'$ to represent the intermodulation products. Now if $m$ and $n$ are both unity, the sum frequency $f+f'$ will be well above the received radio range corresponding to the voice band, while the difference frequency $f-f'$ will be an audible frequency well below the received radio range so that these modulation products will not be effective in the radio receiver. In general, if $m+n$ is an even number, the sum frequencies will be well above the received radio range and the difference frequencies will be well below it so that the intermodulation components will not produce distortion in the received band. If $m+n$ is an odd number however, the sum frequency $mf+nf'$ will be well above the received radio range, but the difference frequency $mf-nf'$ may fall within the received radio range and thereby produce distortion.

To illustrate this concretely let us assume that two adjacent frequencies of the multi-tone group of the system of Fig. 1 are to be transmitted, for example, the frequencies corresponding to the sending filters $f_7$ and $f_8$. If all of the channels are evenly spaced and the spacing frequency be designated $s$, then the two radio frequencies corresponding to the two tones transmitted may be designated by $f$ and $f+s$. The possible modulation components may then be written $mf+n(f+s)$. Now if $m$ and $n$ are both unity the sum frequency will be $2f+s$ which is well above the radio band to be received, and the difference frequency will be equal to $s$ which is an audible tone well below the radio band to be received. If $m=3$ and $n=1$ so that $m+n$ is 4, an even number, the sum frequency will be $4f+s$, and the difference frequency will be $2f-s$, both components being well above the received radio range, and no intermodulation component will be received. If $m$ and $n$ are each equal to 2 the sum frequency will be $4f+2s$ which is well above the received range, and the difference frequency will be $2s$, an audible tone well below the received radio range. In neither of these cases will an intermodulation component be received. Again, if $m$ be unity and $n$ be 3, the sum frequency will be $4f+3s$, well above the received range, and the difference frequency will be $2f+3s$ which is also well above the received radio range. Here again, no intermodulation component will be received.

In all of the foregoing cases the sum of $m+n$ was an even number. Now let us consider the case where $m+n$ is odd. Let us assume that $m$ is 2 and $n$ is 1. Then the sum frequency will be $2f+(f+s)=3f+s$. This frequency is well above the radio band and will not be received. The difference frequency will be $2f-(f+s)$ or $f-s$. This frequency obviously will fall in the multi-tone channel just below the lower of the two intermodulating frequencies and will therefore be represented by an image upon the oscillograph. Now suppose $m$ is 1 and $n$ is 2 so that $m+n$ is again odd. The sum frequency will in this case be $f+2(f+s)=3f+2s$, a frequency which is obviously too high to fall within the received radio band. The difference frequency however, will be $2(f+s)-f$ or $f+2s$. Obviously this will fall within the radio band as it is a frequency corresponding to the channel just above the channel whose frequency is $f+s$.

As another case let us suppose $m$ is 3 and $n$ is 2. The sum frequency will be $3f+2(f+s)$ or $5f+2s$, a frequency obviously too high to be received. The difference frequency will be $3f-2(f+s)$ or $f-2s$. This component obviously will fall into the second channel below the channel whose frequency is $f$ and will produce an image upon the oscillograph record. Finally, let us suppose that $m$ is 2 and $n$ is 3. Then the sum frequency $2f+3(f+s)$ or $5f+3s$ will be too high to be received. The difference frequency $3(f+s)-2f$ or $f+3s$ will obviously correspond to the second channel above the frequency $f+s$ of the two frequencies which are causing the intermodulation. Here again, this frequency will cause an image upon the record of the oscillograph.

In general, where $m+n$ is an odd number the sum frequencies will be too high to be received, but the difference frequencies will be in the vicinity of the received radio band, and those components that fall within the band will cause distortion. The amplitudes of the intermodulation components causing distortion will appear directly from the oscillograph record as images corresponding to channels for which no frequencies were transmitted at the sending end.

It will be obvious that the general principles herein disclosed may be embodied in many other organizations widely different from those illustrated, without departing from the spirit of the invention as defined in the following claims.

What is claimed is:

1. The method of transmisison which consists in simultaneously transmitting over a transmitting medium a plurality of frequencies distributed over the range to be observed, separating the frequencies after transmission, selectively applying the separated frequencies singly and in successive order to a common circuit, and successively indicating the amplitudes of the frequencies in the common circuit.

2. The method of transmission which consists in simultaneously transmitting over a transmitting medium a plurality of frequencies distributed over the range to be observed, separating the frequencies after transmission, selectively applying the separated frequencies singly and in successive order to a common circuit, and translating the currents of different frequencies successively appearing in the common circuit into visual indications definitely related to the amplitudes of the currents.

3. The method of transmission which consists in simultaneously transmitting over a transmitting medium a plurality of frequencies distributed over the range to be observed, separating the frequencies after transmission, selectively applying the separated frequencies singly and in successive order to a common circuit, producing from the successive currents of the different frequencies in the common circuit visual effects definitely related to the amplitudes of said currents, the different frequencies being applied to the common circuit at such a rate of succession that the eye does not detect the interruptions between recurring images corresponding to the same frequency.

4. In a transmission system means to simultaneously apply to a transmission medium a plurality of frequencies distributed over the range to be observed, means for separating the frequencies after transmission, a common circuit including amplitude indicating means, and means for selectively impressing said frequencies upon said common circuit singly and in successive order.

5. In a transmission system means to simultaneously apply to a transmission medium a plurality of frequencies distributed over the range to be observed, means for separating the frequencies after transmission, a common circuit including means to produce visual indications in response to currents, and means to selectively impress said separated frequencies upon said common circuit singly and in successive order.

6. In a transmission system means to simultaneously apply to a transmission medium a plurality of frequencies distributed over the range to be observed, means for separating the frequencies after transmission, a common circuit including means to produce a visual indication corresponding to the amplitude of current in said circuit, and means to selectively impress said separated frequencies upon said common circuit singly and in successive order.

7. In a transmission system means to simultaneously apply to a transmission medium a plurality of frequencies distributed over the range to be observed, means for separating the frequencies after transmission, a common circuit including means to produce a visual indication corresponding to the amplitude of current in said circuit, and means to selectively impress said separated frequencies upon said common circuit singly and in successive order at such a rate of commutation that the eye will not detect the interval between successive visual indications corresponding to the same frequency.

8. In a transmission system means to simultaneously apply to a transmission medium a plurality of frequencies distributed over the range to be observed, means for separating the frequencies after transmission, a cathode ray oscillograph having two sets of deflection plates for deflecting the cathode ray in two planes, means to apply the separated frequencies singly and in successive order to one set of deflection plates to produce deflections definitely related to the amplitude of the selected frequency, and means to cause another set of deflecting plates to deflect the cathode ray in another plane a different amount for each frequency applied to said first mentioned deflecting plates.

9. In a transmission system means to simultaneously apply to a transmission medium a plurality of frequencies distributed over the range to be observed, means for separating the frequencies after transmission, a cathode ray oscillograph having two sets of deflection plates for deflecting the cathode ray in two planes, means to apply the separated frequencies singly and in successive order to one set of deflection plates to produce deflections definitely related to the amplitude of the selected frequency, and means to cause another set of deflecting plates to deflect the cathode ray in another plane a different amount for each frequency applied to said first mentioned deflecting plates, and means to cause the cathode ray of said oscillograph to appear upon the screen of the oscillograph during a predetermined period of such a length as to cause proper exposure of a contact film.

10. In a transmission system means to simultaneously apply to a transmission medium a plurality of frequencies distributed over the range to be observed, means for separating the frequencies after transmission, a cathode ray oscillograph having means to vibrate the ray in one plane in response to alternating currents to produce a visual image on the screen of the oscillograph, means to apply said separated currents to said deflecting means singly and in successive order at such a rate that the eye cannot detect the interruptions between images corresponding to the same frequency, and means to deflect the cathode ray of the oscillograph in a transverse plane successive different amounts in synchronism with the application of the different frequencies to said first mentioned deflecting means to produce separate spaced images for each frequency.

11. In a transmission system means to simultaneously apply to a transmission medium a plurality of frequencies distributed over the range to be observed, means for separating the frequencies after transmission, a cathode ray oscillograph having means to vibrate the ray in one plane in response to alternating currents to produce a visual image on the screen of the oscillograph, means to apply said separated currents to said deflecting means singly and in successive order at such a rate that the eye cannot detect the interruptions between images corresponding to the same frequency, and means to deflect the cathode ray of the oscillograph in a transverse plane successive different amounts in synchronism with the application of the different frequencies to said first mentioned deflecting means to produce separate spaced images for each frequency, and a timing switch for interrupting the cathode ray of the oscillograph so that the cathode ray may be impinged upon the screen to produce a set of images for such a length of time as to properly expose a contact film applied to the screen.

12. In a transmission system means to generate currents of a plurality of frequencies distributed over the transmission range to be observed, means to simultaneously transmit said frequencies over a transmission medium, means for separating the received frequencies into a corresponding number of individual circuits, a commutator having segments for each of said individual circuits, and a common brush for successively wiping over said segments, and an oscillograph connected to said brush.

13. In a transmission system means to generate currents of a plurality of frequencies distributed over the transmission range to be observed, means to simultaneously transmit said frequencies over a transmission medium, means for separating the received frequencies into a corresponding number of individual circuits, a commutator having segments for each of said individual circuits, and a common brush for successively wiping over said segments, a cathode ray oscillograph having one set of deflecting plates connected to said brush, a second commutator having different constant potentials applied to its segments and having its brush connected to another set of deflecting plates of said oscillograph.

14. In a transmission system means to generate currents of a plurality of frequencies distributed over the transmission range to be observed, means to simultaneously transmit said frequencies over a transmission medium, means for separating the received frequencies into a corresponding number of individual circuits, a commutator having segments for each of said individual circuits, and a common brush for successively wiping over said segments, a cathode ray oscillograph having one set of deflecting plates connected to said brush, a second commutator having different constant potentials applied to its segments and having its brush connected to another set of deflecting plates of said oscillograph, the rate of commutation of said commutators being such that the eye will not detect interruptions of the images appearing on the screen of said oscillograph.

15. In a transmission system, a plurality of receiving channels having frequencies assigned thereto and distributed over the range to be observed, a transmission medium, means to transmit frequencies through said medium to certain of said receiving channels, a common circuit including amplitude indicating means, and means for associating said common circuit with each of said receiving channels singly and in successive order.

16. In a transmission system, a plurality of receiving channels having frequencies assigned thereto and distributed over the range to be observed, a transmission medium, means to transmit frequencies through said medium to certain of said transmitting channels, a common circuit including means to produce visual indication in response to currents, and means for associating said common circuit with each of said receiving channels singly and in successive order.

In testimony whereof, we have signed our names to this specification this 21st day of October, 1929.

RALPH BOWN.
RALPH K. POTTER.